US012691502B2

(12) United States Patent
Athad

(10) Patent No.: US 12,691,502 B2
(45) Date of Patent: Jul. 28, 2026

(54) CUTTING TOOL AND CUTTING INSERT HAVING A MOUNTING CUT-OUT THEREFOR

(71) Applicant: ISCAR, LTD., Tefen (IL)

(72) Inventor: Shimon Athad, Maalot (IL)

(73) Assignee: ISCAR, LTD., Tefen (IL)

( * ) Notice: Subject to any disclaimer, the term of this patent is extended or adjusted under 35 U.S.C. 154(b) by 338 days.

(21) Appl. No.: 18/500,446

(22) Filed: Nov. 2, 2023

(65) Prior Publication Data

US 2025/0144715 A1    May 8, 2025

(51) Int. Cl.
    *B23B 27/16*         (2006.01)
(52) U.S. Cl.
    CPC .......... *B23B 27/16* (2013.01); *B23B 2200/28* (2013.01); *B23B 2205/12* (2013.01)
(58) Field of Classification Search
    CPC . B23B 27/16; B23B 2200/28; B23B 2205/12; B23B 27/007; B23B 2200/3618; B23B 2200/369; B23B 2205/02; B23B 2240/04; B23B 27/04; B23B 29/043; B23B 27/1622
    USPC ................................................. 408/199, 200
    See application file for complete search history.

(56) References Cited

U.S. PATENT DOCUMENTS 7,300,232 B2 * 11/2007 Wiman ................. B23B 27/145
                                                  407/103
8,708,613 B2 * 4/2014 Hecht ...................... B23B 27/04
                                                  407/103

9,421,622 B2 * 8/2016 Segev ...................... B23B 51/00
9,457,409 B2 * 10/2016 Zeeb ........................ B23B 27/04
9,656,323 B2 * 5/2017 Harif ....................... B23B 51/02
10,710,164 B2 * 7/2020 Harif ....................... B23B 51/06
2005/0152754 A1 * 7/2005 Wiman ............... B23B 27/1611
                                            407/103
2013/0251463 A1 * 9/2013 Harif ....................... B23B 27/04
                                            407/11
2013/0266384 A1 * 10/2013 Hecht ..................... B23B 27/04
                                            407/103
2014/0050542 A1 * 2/2014 Zeeb ...................... B23B 27/164
                                            407/103

(Continued)

FOREIGN PATENT DOCUMENTS

CH             692 449 A5      6/2022

*Primary Examiner* — Lawrence Averick
(74) *Attorney, Agent, or Firm* — Womble Bond Dickinson (US) LLP

(57)             ABSTRACT

A cutting tool has a cutting insert removably secured to a holding portion of an insert holder. The cutting insert has opposing first and second end surfaces with an insert peripheral surface and a central axis extending therebetween, at least one cutting portion, and at least one mounting cut-out. Each cutting portion has a cutting edge and an adjacent relief surface facing in a first rotary direction about the central axis. Each mounting cut-out extends between the first and second end surfaces and has a first flank surface and an adjacent first upper slope surface. The first flank surface faces in a second rotary direction about the central axis and the first upper slope surface faces away from a median plane located midway between the first and second end surfaces. The first upper slope surface extends away from the median plane with increasing distance from the first flank surface.

24 Claims, 7 Drawing Sheets

(56)         References Cited

U.S. PATENT DOCUMENTS

2015/0196961 A1 *   7/2015   Segev  ..................... B23B 51/00
                                                          408/201
2025/0144717 A1 *   5/2025   Hecht  ................. B23B 27/1611

* cited by examiner

CUTTING TOOL AND CUTTING INSERT HAVING A MOUNTING CUT-OUT THEREFOR

FIELD OF THE INVENTION

The present invention relates to metal cutting tools for use in groove turning operations having a cutting insert with a mounting cut-out.

BACKGROUND OF THE INVENTION

Within the field of metal cutting tools used in groove turning operations, cutting inserts removably securable in an insert holder have long since provided a way of performing a cutting operation with a suitably hard material, i.e., cemented carbide, in the vicinity of the cutting edge, where the insert holder, manufactured from a less hard material, is reusable following the disposal of a worn or damaged cutting insert.

This type of cutting tool has been further developed to provide a more efficient means of securing the cutting insert to the insert holder.

CH 692449 A discloses a static or rotating tool holder, for a machine tool, having a holder section placed on an exchangeable tool plate carrier with a locking bolt system. The holder section has a carrier and/or centering unit to give it an accurate position at the carrier, by means of studs which fit into matching drillings.

U.S. Pat. No. 8,708,613 B2 discloses a cutting tool used for internal machining operations, whereby a cutting insert with a single cutting portion is removably secured to an insert holder. The cutting insert has two opposing end surfaces, and an insert peripheral surface extending therebetween having three spaced apart abutment surfaces. The insert holder has a holder portion with a holder peripheral surface and an adjacent seating surface. At least one protuberance having four spaced apart reaction surfaces protrudes from the seating surface. The cutting insert is securable to the holding portion in left-hand and right-hand assembly positions, with the three abutment surfaces in clamping contact with three of the four reaction surfaces. In the left-hand assembly position, a first end surface is in clamping contact with the seating surface, and in the right-hand assembly position, a second end surface is in clamping contact with the seating surface.

U.S. Pat. No. 9,457,409 B2 discloses an indexable cutting insert with a plate-like main body having two parallel main surfaces and a peripheral surface connecting the two main surfaces and with a plurality of sections angled with respect to one another, wherein four cutting edges that extend transversely to the main surfaces are provided on the peripheral surface at the transition to sections, that are angled with respect to one another, of the peripheral surface, and wherein the position of the cutting edges defines a quadrilateral in the plan view of the main surfaces. Fixing with more favorable leverages and permanently more precise positioning of the cutting edges are provided by the quadrilateral having in each case two short and two long sides and cutting edges oriented in each case in opposite directions in the peripheral direction at adjacent corners and oriented in each case in the same direction at diagonally opposite corners of the quadrilateral.

U.S. Pat. No. 9,421,615 B2 discloses a cutting tool having an indexable cutting insert with exactly four cutting portions, the cutting insert removably securable to an insert holder by a fastener. The cutting insert has two opposing end surfaces with a peripheral side surface extending therebetween, and each cutting portion has a major cutting edge formed by the intersection of a rake surface and a relief surface. The peripheral side surface has first and second pairs of opposing side surfaces which include the four relief surfaces and the four rake surfaces, respectively. In an end view, four cutting points on the four major cutting edges define the transitions between the first and second pairs of opposing side surfaces, and a minimum first length dimension between the second pair of opposing side surfaces is less than six-tenths of a minimum second length dimension between two of the four cutting points.

It is an object of the present invention to provide an improved cutting insert which can be economically manufactured.

It is also an object of the present invention to provide an improved cutting insert having a high level of strength and rigidity.

It is a further object of the present invention to provide an improved cutting tool which can perform groove turning operations.

It is yet a further object of the present invention to provide an improved cutting tool benefiting from reduced 'down' time associated with indexing and/or replacement of the cutting insert, and a reduced risk of inadvertent falling parts, whilst still providing secure clamping and accurate positioning of the cutting insert.

SUMMARY OF THE INVENTION

In accordance with one aspect of the present invention, there is provided a cutting insert comprising opposing first and second end surfaces with an insert peripheral surface and a central axis extending therebetween, the cutting insert having at least one cutting portion, at least one mounting cut-out, and a central through bore extending between and intersecting the first and second end surfaces, a median plane perpendicular to the central axis is located midway between the first and second end surfaces, and the first and second end surfaces are located on first and second sides of the median plane, respectively, each of the at least one cutting portion having a cutting edge formed at the intersection of a rake surface and a relief surface, the at least one rake surface and the at least one relief surface formed on the insert peripheral surface, at least one of the at least one rake surface facing in a first rotary direction about the central axis, each of the at least one mounting cut-out extending between and intersecting the first and second end surfaces and having a cut-out peripheral surface, the cut-out peripheral surface including a first flank surface and at least one adjacent first slope surface, the at least one first flank surface facing in a second rotary direction about the central axis opposite to the first rotary direction, and one of the at least one first slope surface being a first upper slope surface located on the first side of the median plane, facing away from the median plane, wherein, in a cross-section taken in a first plane parallel to the central axis and transversely intersecting one of the at least one first flank surface and the adjacent first upper slope surface:

the first upper slope surface extends away from the median plane with increasing distance from the first flank surface;

a first imaginary straight line tangential to the first upper slope surface forms an acute first slope angle with the median plane; and the first slope angle is greater than five degrees and less than twenty-five degrees.

In accordance with another aspect of the invention, there is provided a cutting tool comprising an insert holder and a cutting insert of the sort described above retained therein, the insert holder having a holding portion extending along a longitudinal tool axis, the longitudinal tool axis defining a forward-to-rearward direction, and the holding portion having a front end surface transverse to the longitudinal tool axis facing in the forward direction and a seating surface disposed on the front end surface, the seating surface having spaced apart first and second mounting protuberances protruding therefrom, the cutting insert is removably securable to the holding portion, wherein, in an assembled position of the cutting tool:

one of the first and second end surfaces is in abutting contact with the seating surface, the first mounting protuberance occupies the central through bore, the second mounting protuberance occupies one of the at least one mounting cut-out, exactly one of the at least one cutting portion is operative, and in an end view of the cutting tool, the rake surface of the operative cutting portion faces in an operative rake direction about the central axis.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

Attention is first drawn to FIGS. 1 to 8, showing a cutting insert 20 which may be manufactured by form pressing and sintering a cemented carbide, such as tungsten carbide, and may be coated or uncoated.

The cutting insert 20 has opposing first and second end surfaces 22a, 22b with an insert peripheral surface 24 and a central axis AC extending therebetween.

In some embodiments of the present invention, the insert peripheral surface 24 may be continuous, defining a circumferential boundary of the first and second end surfaces 22a, 22b.

Figure 5:
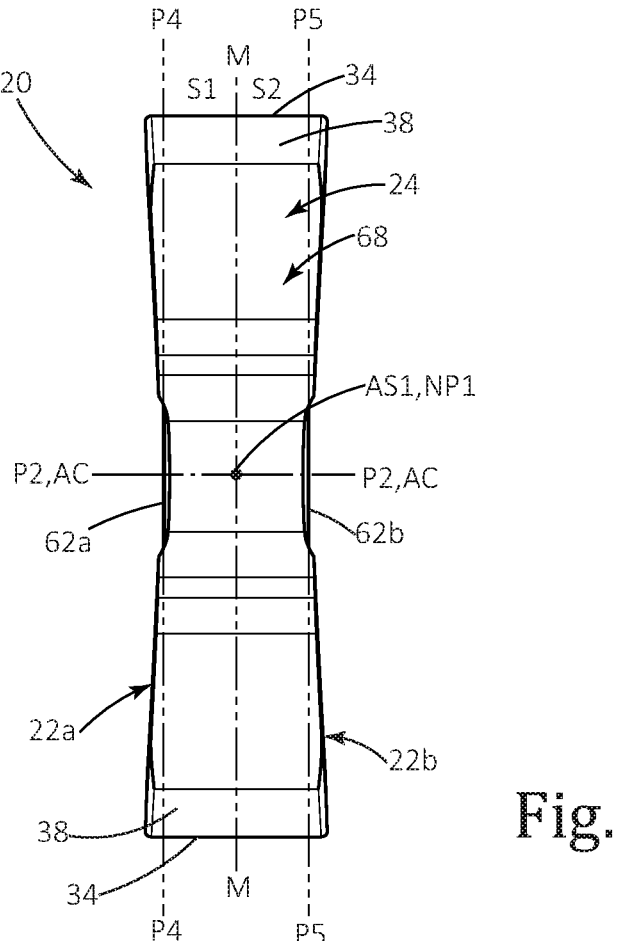
FIG. 5 is a side view of the cutting insert shown in FIG. 2.
Figure 6:
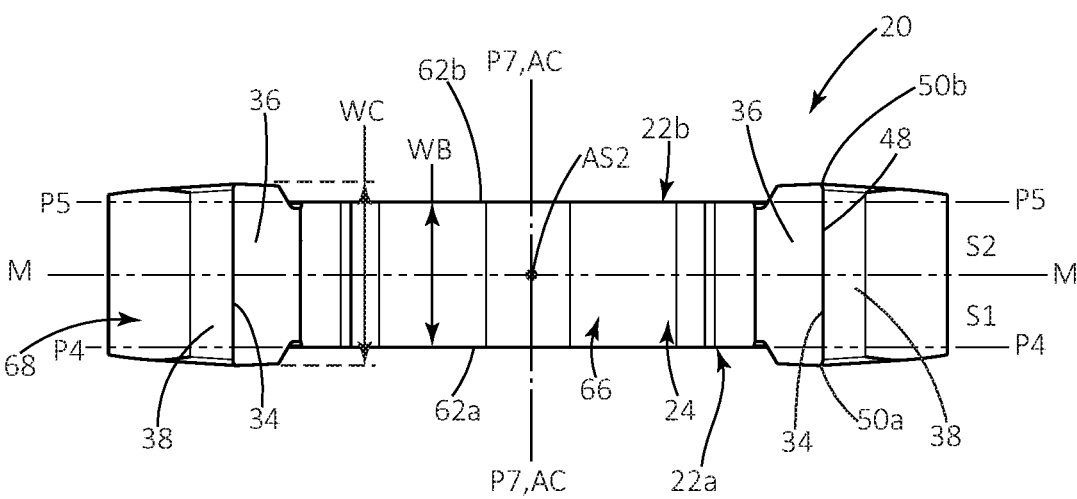
FIG. 6 is a top view of the cutting insert shown in FIG. 2.

As shown in FIGS. 5 and 6, a median plane M perpendicular to the central axis AC is located midway between the first and second end surfaces 22a, 22b, and the first and second end surfaces 22a, 22b are located on first and second sides S1, S2 of the median plane M, respectively.

Figure 1:
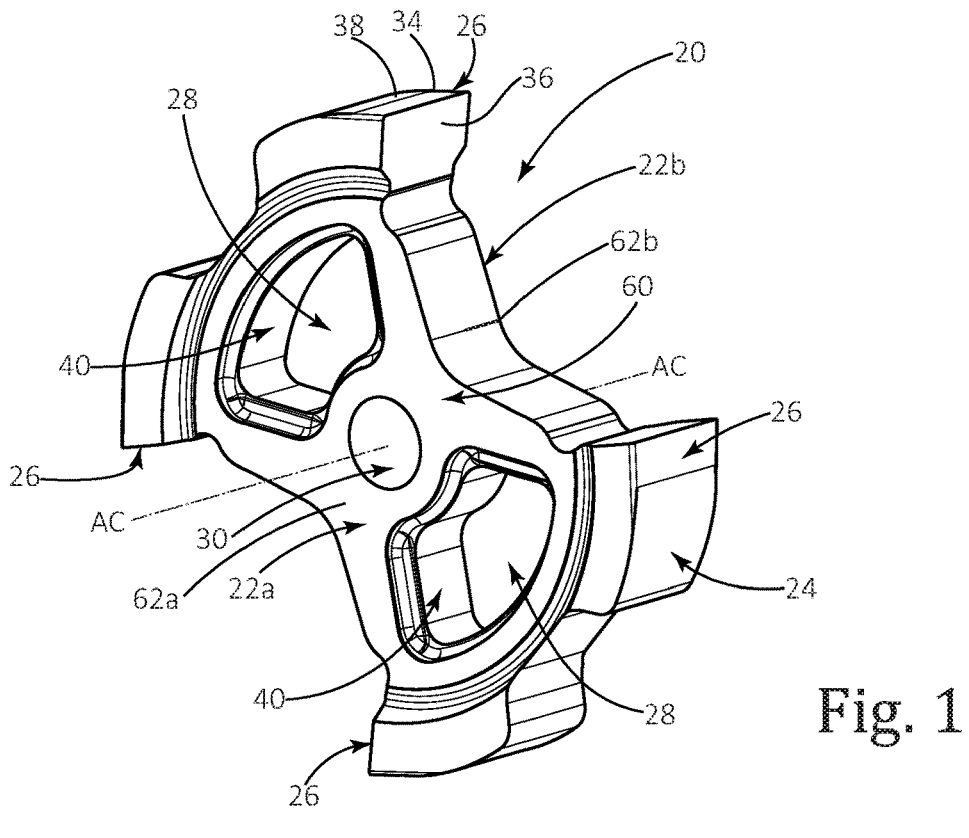
FIG. 1 is a perspective view of a cutting insert in accordance with some embodiments of the present invention.
Figure 2:
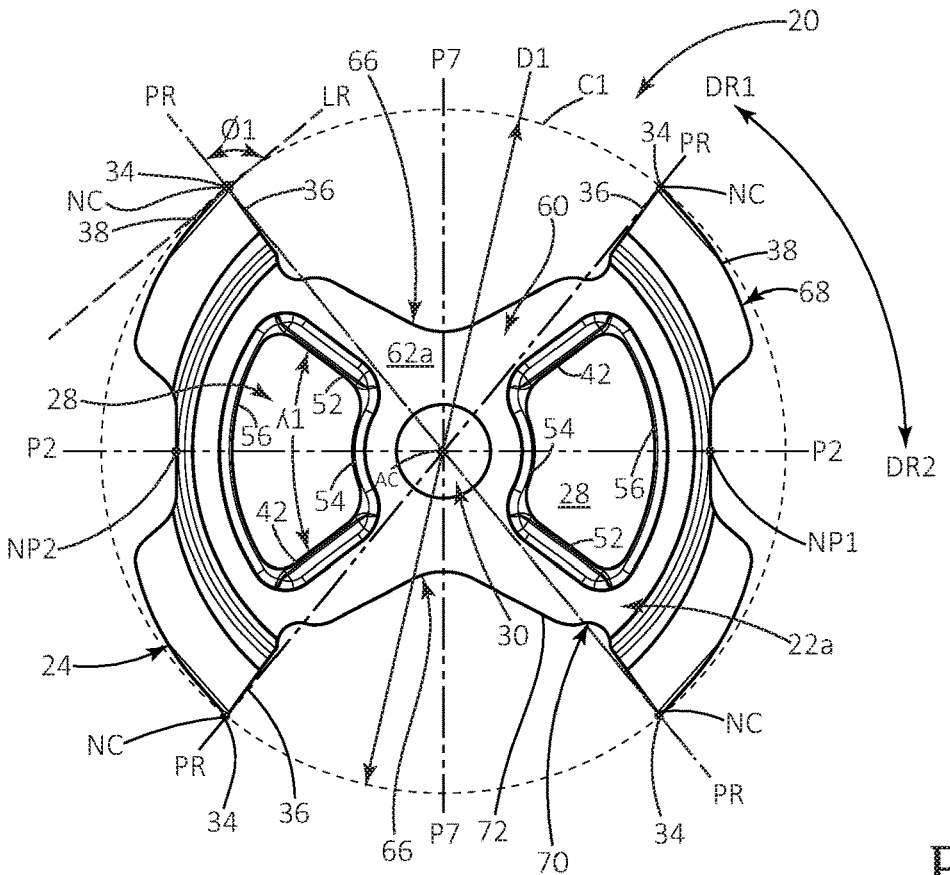
FIG. 2 is an end view of the cutting insert shown in FIG. 1.

As shown in FIGS. 1 and 2, the cutting insert 20 has at least one cutting portion 26, at least one mounting cut-out 28, and a central through bore 30 extending between and intersecting the first and second end surfaces 22a, 22b.

In some embodiments of the present invention, the central through bore 30 may be coaxial with the central axis AC.

Also, in some embodiments of the present invention, the central through bore 30 may have a cylindrical inner bore surface 32.

Each of the at least one cutting portion 26 has a cutting edge 34 formed at the intersection of a rake surface 36 and a relief surface 38. The cutting edge 34 extends between the first and second end surfaces 22a, 22b.

Each of the at least one cutting portion 26 is devoid of an insert receiving pocket, for example as compared to the exchangeable tool plate carrier seen in aforementioned CH 692449 A, discussed above.

As shown in FIGS. 1 and 2, the at least one rake surface 36 and the at least one relief surface 38 are formed on the insert peripheral surface 24, and at least one of the at least one rake surface 36 faces in a first rotary direction DR1 about the central axis AC.

Each of the at least one mounting cut-out 28 extends between and intersects the first and second end surfaces 22a, 22b and has a cut-out peripheral surface 40. The cut-out peripheral surface 40 includes a first flank surface 42 and at least one adjacent first slope surface 44a, 44b.

Figure 7:
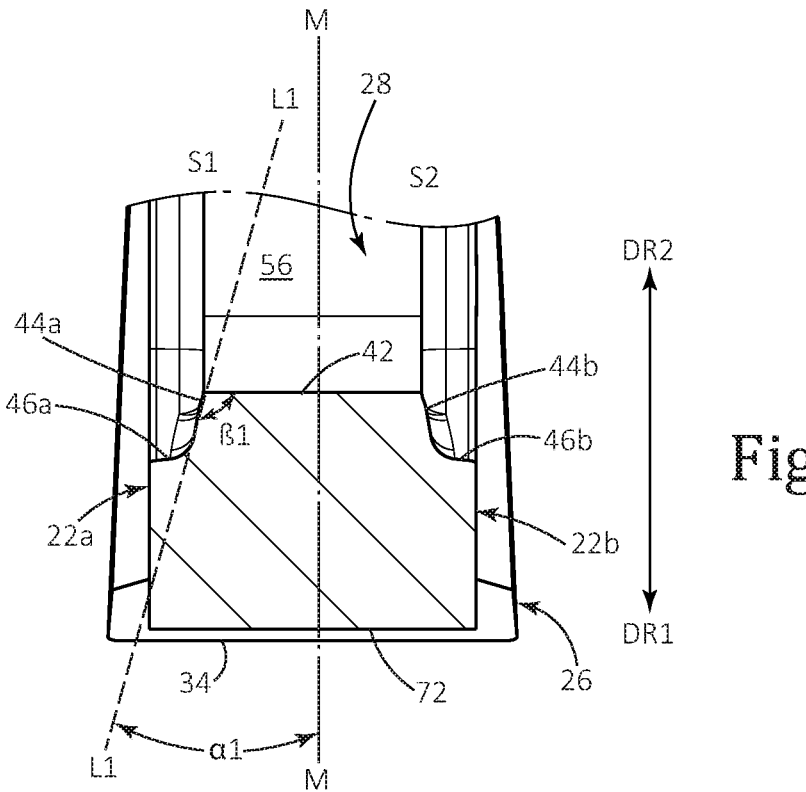
FIG. 7 is a cross-sectional view of the cutting insert shown in FIG. 3, taken along the line VII-VII.

As shown in FIG. 7, one of the at least one first slope surface 44a, 44b is a first upper slope surface 44a located on the first side S1 of the median plane M, facing away from the median plane M.

In some embodiments of the present invention, the first upper slope surface 44a may be planar.

Also, in some embodiments of the present invention, as shown in FIG. 7, the first upper slope surface 44a may be axially spaced apart along the central axis AC from the first end surface 22a by a first upper transitional surface 46a.

By configuring the cutting insert 20 with at least one mounting cut-out 28 extending between and intersecting the first and second end surfaces 22a, 22b, the cutting insert 20 may have a reduced volume and be economically manufactured from a reduced amount of cemented carbide.

As shown in FIGS. 1 and 2, the at least one first flank surface 42 faces in a second rotary direction DR2 about the central axis AC opposite to the first rotary direction DR1.

In some embodiments of the present invention, the at least one first flank surface 42 may be planar.

Also, in some embodiments of the present invention, the at least one first flank surface 42 may be parallel to the central axis AC.

Further, in some embodiments of the present invention, the median plane M may intersect the first flank surface 42 of each of the at least one mounting cut-out 28.

As shown in FIGS. 1 and 2, the cut-out peripheral surface 40 of each of the at least one mounting cut-out 28 may be separate and spaced apart from the insert peripheral surface 24.

In some embodiments of the present invention, each of the at least one cut-out peripheral surface 40 may be continuous, defining a circumferential boundary of the associated mounting cut-out 28. For such embodiments of the present invention, each of the at least one mounting cut-out 28 may be described as a 'closed' mounting cut-out 28.

For embodiments of the present invention in which each of the at least one mounting cut-out 28 is a 'closed' mounting cut-out 28, it should be appreciated that the cutting insert 20 has an advantageously high level of strength and rigidity.

As shown in FIG. 7, in a cross-section taken in a first plane P1 parallel to the central axis AC and transversely intersecting one of the at least one first flank surface 42 and the adjacent first upper slope surface 44*a*, the first upper slope surface 44*a* extends away from the median plane M with increasing distance from the first flank surface 42.

Also, as shown in FIG. 7, in the cross-section taken in the first plane P1, a first imaginary straight line L1 tangential to the first upper slope surface 44*a* forms an acute first slope angle α1 with the median plane M, and the first slope angle α1 is greater than five degrees and less than twenty-five degrees, i.e., 5°<α1<25°.

In some embodiments of the present invention, as shown in FIG. 7, in the cross-section taken in the first plane P1, the first upper slope surface 44*a* may form an internal obtuse first corner angle β1 with the adjacent first flank surface 42.

It should be appreciated that use of the term "internal angle" throughout the description and claims refers to an angle between two surface components as measured internal to the member on which these surface components are formed.

As shown in FIGS. 1 and 2, the cutting insert 20 may be indexable and have at least two cutting portions 26.

The cutting edge 34 of each cutting portion 26 has a radially outermost cutting point NC, and in an end view of the cutting insert 20, as shown in FIG. 2, the at least two radially outermost cutting points NC define a first imaginary circle C1 having a first diameter D1 and a center coincident with the central axis AC.

In some embodiments of the present invention, the median plane M may intersect each of the at least two cutting edges 34.

Also, in some embodiments of the present invention, each cutting edge 34 may have a rectilinear main cutting edge-portion 48 extending between two curved corner cutting edge-portions 50*a*, 50*b*.

Further, in some embodiments of the present invention, each main cutting edge-portion 48 may traverse the median plane M and be perpendicular thereto.

For embodiments of the present invention in which each cutting edge's main cutting edge-portion 48 is perpendicular to the median plane M, it should be appreciated that the cutting edge's radially outermost cutting point NC is any point along the main cutting edge-portion 48.

As shown in FIG. 2, at least one of the at least two rake surfaces 36 may face in the second rotary direction DR2 about the central axis AC.

In some embodiments of the present invention, each of the at least one mounting cut-out 28 may have a second flank surface 52 disposed on its cut-out peripheral surface 40.

As shown in FIG. 2, the at least one second flank surface 52 may face in the first rotary direction DR1 about the central axis AC.

In some embodiments of the present invention, the at least one second flank surface 52 may be planar.

Also, in some embodiments of the present invention, the at least one second flank surface 52 may be parallel to the central axis AC.

Further, in some embodiments of the present invention, the median plane M may intersect the second flank surface 52 of each of the at least one mounting cut-out 28.

Figure 3:
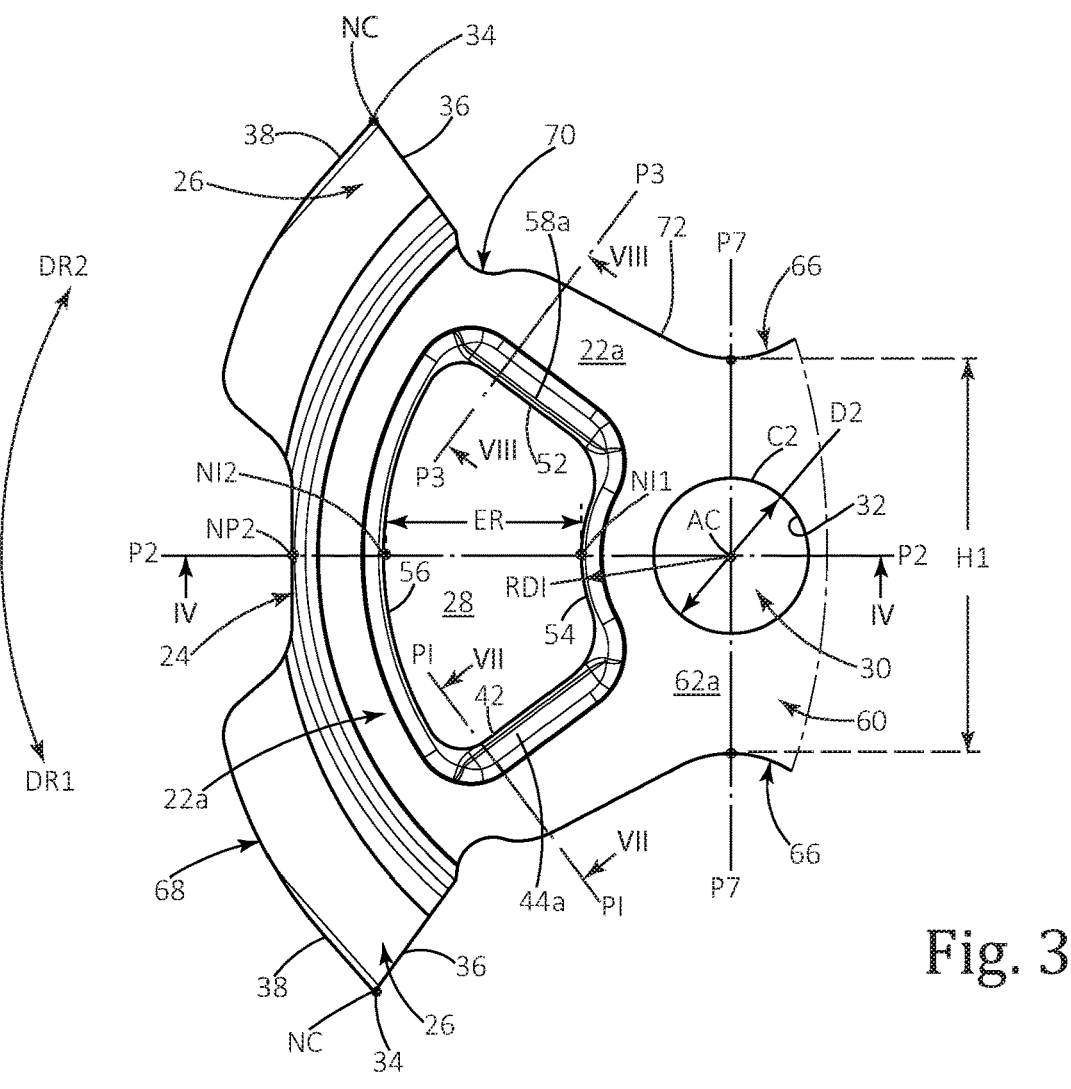
FIG. 3 is a detailed view of the cutting insert shown in FIG. 2.

As shown in FIGS. 2 and 3, a second plane P2 containing the central axis AC traverses at least one of the at least one mounting cut-out 28.

In some embodiments of the present invention, the first and second flank surfaces 42, 52 of at least one of the at least one mounting cut-out 28 may be entirely located on opposite sides of the second plane P2.

As shown in FIGS. 2 and 3, the first and second flank surfaces 42, 52 of each of the at least one mounting cut-out 28 may be spaced apart by a first intermediate surface 54.

In some embodiments of the present invention, the at least one first intermediate surface 54 may have a convex shape.

Also, in some embodiments of the present invention, the at least one first intermediate surface 54 may be convexly curved.

In an end view of the cutting insert 20, as shown in FIG. 3, the second plane P2 intersects at least one of the at least one first intermediate surface 54 at a first intersection point NI1 located a first radial distance RD1 from the central axis AC.

In some embodiments of the present invention, the first radial distance RD1 may be less than twenty percent of the first diameter D1, i.e., RD1<0.20*D1.

Also, in some embodiments of the present invention, the first radial distance RD1 may be greater than ten percent of the first diameter D1, i.e., RD1>0.10*D1.

As shown in FIGS. 2 and 3, the cut-out peripheral surface 40 of each of the at least one mounting cut-out 28 may include a second intermediate surface 56 located radially further from the central axis AC than the first intermediate surface 54.

In some embodiments of the present invention, the at least one second intermediate surface 56 may have a concave shape.

Also, in some embodiments of the present invention, the at least one second intermediate surface 56 may be concavely curved.

In an end view of the cutting insert 20, as shown in FIG. 3, the second plane P2 may intersect at least one of the at least one second intermediate surface 56 at a second intermediate point NI2, and the first and second intermediate points NI1, NI2 of at least one of the at least one mounting cut-out 28 may define a cut-out radial extent ER along the second plane P2.

In some embodiments of the present invention, the cut-out radial extent ER may be greater than ten percent of the first diameter D1, i.e., ER>0.10*D1.

Also, in some embodiments of the present invention, the cut-out radial extent ER may be less than twenty-five percent of the first diameter D1, i.e., ER<0.25*D1.

Further, in some embodiments of the present invention, the first and second flank surfaces 42, 52 of each of the at least one mounting cut-out 28 may diverge away from each other with increased distance from the central axis AC.

As shown in FIGS. 2 and 3, the first and second flank surfaces 42, 52 of each of the at least one mounting cut-out 28 may form an external mounting angle λ1.

It should be appreciated that use of the term "external angle" throughout the description and claims refers to an angle between two surface components as measured external to the member on which these surface components are formed.

In some embodiments of the present invention, the mounting angle λ1 may have a range from forty degrees to one hundred and twenty degrees, i.e., 40°≤λ1≤120°.

Also, in some embodiments of the present invention, the mounting angle λ1 may preferably have a range from fifty degrees to ninety degrees, i.e., 50°≤λ1≤90°.

Figure 8:
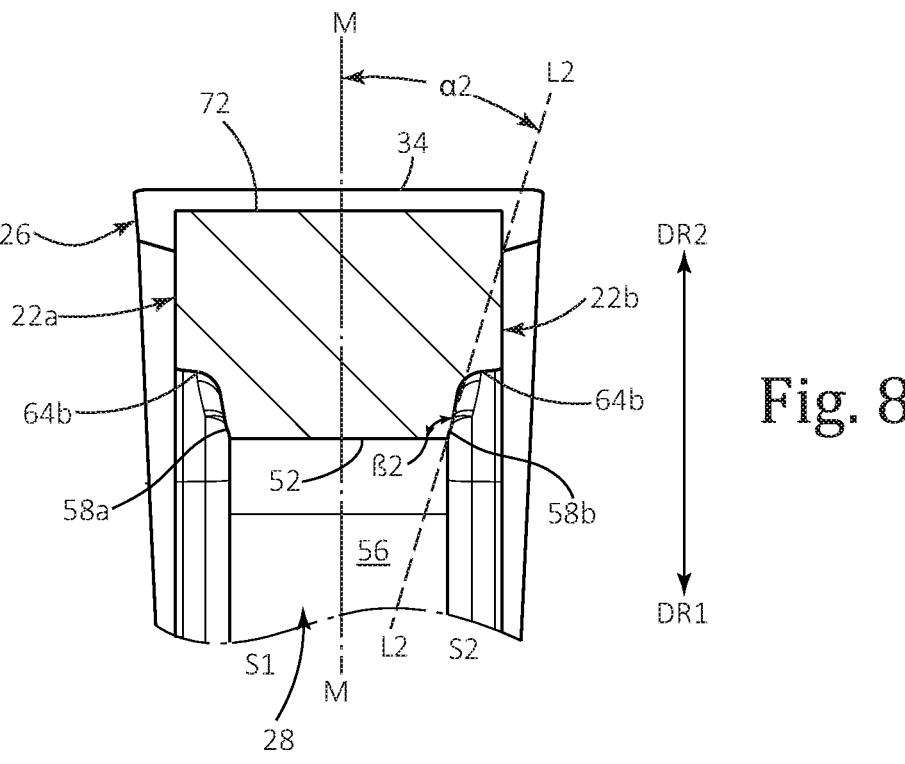
FIG. 8 is a cross-sectional view of the cutting insert shown in FIG. 3, taken along the line VIII-VIII.

As shown in FIG. 8, each of the at least one mounting cut-out 28 may have at least one second slope surface 58a, 58b disposed on its cut-out peripheral surface 40 adjacent the second flank surface 52.

Also, as shown in FIG. 8, the at least one second slope surface 58a, 58b may face away from the median plane M.

In some embodiments of the present invention, the at least one second slope surface 58a, 58b may be planar.

As shown in FIG. 8, in a cross-section taken in a third plane P3 parallel to the central axis AC and transversely intersecting one of the at least one second flank surface 52 and the adjacent second slope surface 58a, 58b, the second slope surface 58a, 58b may extend away from the median plane M with increasing distance from the second flank surface 52.

Also, as shown in FIG. 8, in the cross-section taken in the third plane P3, a second imaginary straight line L2 tangential to the second slope surface 58a, 58b may form an acute second slope angle α2 with the median plane M, and the second slope angle α2 may be equal to the first slope angle α1.

In some embodiments of the present invention, as shown in FIG. 8, in the cross-section taken in the third plane P3, the second slope surface 58a, 58b may form an internal obtuse second corner angle β2 with the adjacent second flank surface 52.

Also, in some embodiments of the present invention, the first and second corner angles β1, β2 may be equal.

As shown in FIGS. 1 and 2, the central through bore 30 may extend through a central body portion 60 of the cutting insert 20 and intersect first and second central sub-surfaces 62a, 62b of the first and second end surfaces 22a, 22b, respectively.

In a direction parallel to the central axis AC, as shown in FIG. 6, each cutting portion 26 has a cutting width WC defined by its cutting edge 34, and the central body portion 60 has a body width WB defined by the first and second central sub-surfaces 62a, 62b.

In some embodiments of the present invention, the body width WB may be less than the cutting width WC of each cutting portion 26.

As shown in FIGS. 5 and 6, the first and second central sub-surfaces 62a, 62b may define fourth and fifth planes P4, P5 perpendicular to the central axis AC.

In some embodiments of the present invention, the first upper slope surface 44a and the second slope surface 58a, 58b of each of the at least one mounting cut-out 28 may be entirely located between the fourth and fifth planes P4, P5.

Also, in some embodiments of the present invention, each cutting edge 34 may traverse the fourth and fifth planes P4, P5.

In an end view of the cutting insert 20, as shown in FIG. 3, the cylindrical inner bore surface 32 may define a second imaginary circle C2 having a second diameter D2.

In some embodiments of the present invention, the second diameter D2 may be less than twenty percent of the first diameter D1, i.e., D2<0.20*D1.

Also, in some embodiments of the present invention, the second diameter D2 may be greater than ten percent of the first diameter D1, i.e., D2>0.10*D1.

Further, in some embodiments of the present invention, the second diameter D2 may define a minimum diameter of the central through bore 30.

Figure 4:
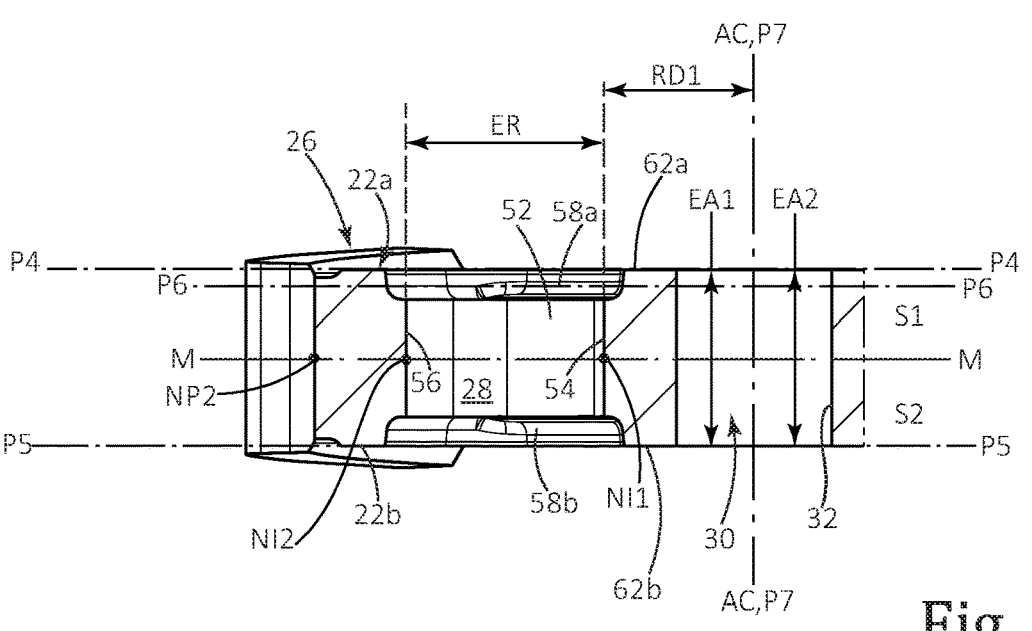
FIG. 4 is a cross-sectional view of the cutting insert shown in FIG. 3, taken along the line IV-IV.

As shown in FIG. 4, a sixth plane P6 perpendicular the central axis AC intersects the cylindrical inner bore surface 32.

In some embodiments of the present invention, the sixth plane P6 may be located further from the median plane M than at least a portion of the first upper slope surface 44a and at least a portion of the second slope surface 58a, 58b.

As shown in FIG. 4, the central through bore 30 has a first axial extent EA1 along the central axis AC and the cylindrical inner bore surface 32 has a second axial extent EA2 along the central axis AC.

In some embodiments of the present invention, the first axial extent EA1 may be the entire axial extent of the central through bore 30 and be equal to the body width WB.

Also, in some embodiments of the present invention, the second axial extent EA2 may be greater than sixty percent of the first axial extent EA1, i.e., EA2>0.60*EA1. For such embodiments of the present invention, it should be appreciated that at every cross-section taken in a plane perpendicular to the central axis AC along the second axial extent EA2, the cylindrical inner bore surface 32 may have a diameter equal to the second diameter D2. FIG. 4 shows an embodiment of the invention in which the cylindrical inner bore surface's second axial extent EA2 is equal to the central through bore's first axial extent EA1, or in other words, the cylindrical inner bore surface 32 extends the entire axial extent of the central through bore 30.

As shown in FIG. 8, the at least one second slope surface 58a, 58b may be a second lower slope surface 58b located on the second side S2 of the median plane M.

In some embodiments of the present invention, the at least one second lower slope surface 58b may be axially spaced apart along the central axis AC from the second end surface 22b by a second lower transitional surface 64b.

As shown in FIGS. 4, 7 and 8, each of the at least one mounting cut-out 28 may exhibit mirror symmetry about the median plane M. For such embodiments of the present invention, each of the at least one mounting cut-out 28 may include a first lower slope surface 44b adjacent the first flank surface 42 and a second upper slope surface 58a adjacent the second flank surface 52. Also, for such embodiments of the present invention, the first lower slope surface 44b may be axially spaced apart along the central axis AC from the second end surface 22b by a first lower transitional surface 46b, and the second upper slope surface 58a may be axially spaced apart along the central axis AC from the first end surface 22a by a second upper transitional surface 64a.

In some embodiments of the present invention, the cutting insert 20 may exhibit mirror symmetry about the median plane M.

As shown in FIGS. 1 and 2, the cutting insert 20 may have exactly two mounting cut-outs 28.

In some embodiments of the present invention, the two mounting cut-outs 28 may be identical.

Also, in some embodiments of the present invention, the second plane P2 may traverse both mounting cut-outs 28.

Further, in some embodiments of the present invention, the first and second flank surfaces 42, 52 of both mounting cut-outs 28 may be entirely located on opposite sides of the second plane P2.

As shown in FIG. 2, the cutting insert 20 may exhibit mirror symmetry about the second plane P2.

In some embodiments of the present invention, the cutting insert 20 may exhibit 2-fold rotational symmetry about a first axis of symmetry AS1 formed at the intersection of the median plane M and the second plane P2.

Also, in some embodiments of the present invention, the cutting insert 20 may have exactly four cutting portions 26.

For embodiments of the present invention in which the cutting insert 20 has exactly four cutting portions 26, the insert peripheral surface 24 may have first and second pairs of opposing side surfaces 66, 68, the first pair of opposing side surfaces 66 including the four rake surfaces 36 and the second pair of opposing side surfaces 68 including the four relief surfaces 38.

As shown in FIG. 2, in an end view of the cutting insert 20, the four radially outermost cutting points NC of the four cutting edges 34 may define the transitions between the first and second pairs of opposing side surfaces 66, 68.

In some embodiments of the present invention, the cutting insert 20 may exhibit 2-fold rotational symmetry about the central axis AC.

For embodiments of the present invention in which the cutting insert 20 exhibits 2-fold rotational symmetry about the central axis AC, the first flank surfaces 42 of the two mounting cut-outs 28 may be parallel to each other, and the second flank surfaces 52 of the two mounting cut-outs 28 may be parallel to each other.

As shown in FIG. 2, the first pair of opposing side surfaces 66 may be located on opposite sides of the second plane P2, and the second pair of opposing side surfaces 68 may be located on opposite sides of a seventh plane P7 containing the central axis AC and being perpendicular to the second plane P2.

In some embodiments of the present invention, the cutting insert 20 may exhibit mirror symmetry about the seventh plane P7.

Also, in some embodiments of the present invention, the cutting insert 20 may exhibit 2-fold rotational symmetry about a second axis of symmetry AS2 formed at the intersection of the median plane M and the seventh plane P7.

As shown in FIG. 2, the second plane P2 may intersect the second pair of opposing side surfaces 68 at first and second peripheral points NP1, NP2, and the first and second peripheral points NP1, NP2 may be located on opposite sides of the seventh plane P7.

As shown in FIGS. 2 and 3, each cutting portion 26 has a radial plane PR containing the central axis AC and its associated radially outermost cutting point NC.

In some embodiments of the present invention, each rake surface 36 may face towards its associated radial plane PR.

For embodiments of the present invention in which each rake surface 36 faces towards its associated radial plane PR, the cutting insert 20 may be particularly suitable for use in internal groove turning operations.

As shown in FIG. 2, each radial plane PR forms an acute relief angle $\phi 1$ with a straight imaginary relief line LR coincident with or tangential to the relief surface 38 immediately adjacent its associated radially outermost cutting point NC.

In some embodiments of the present invention, the acute relief angle $\phi 1$ may have a value equal to or greater than seventy degrees, i.e., $\phi 1 \geq 70°$.

Configuring each cutting portion 26 to have a relief angle $\phi 1$ equal to or greater than seventy degrees advantageously provides robust support for the associated cutting edge 34 during internal groove turning operations.

As shown in FIGS. 1 to 3, the first pair of opposing side surfaces 66 may have a chip evacuation surface 70 adjacent each rake surface 36.

In some embodiments of the present invention, each radial plane PR may intersect the chip evacuation surface 70 adjacent its associated rake surface 36. For such embodiments of the present invention, it should be appreciated that the first pair of opposing side surfaces 66 advantageously provide sufficient space adjacent each rake surface 36 to enable efficient chip forming.

Also, in some embodiments of the present invention, as shown in FIGS. 1 to 3, each chip evacuation surface 70 may include a ramp surface 72 extending towards the second plane P2 with decreasing distance from the seventh plane P7.

As shown in FIGS. 2 and 3, a first insert height H1 is measured between the first pair of opposing side surfaces 66 perpendicular to the second plane P2.

In some embodiments of the present invention, the first insert height H1 may be less than fifty percent of the first diameter D1, i.e., H1<0.50*D1.

Also, in some embodiments of the present invention, the first insert height H1 may be greater than twenty-five percent of the first diameter D1, i.e., H1>0.25*D1.

Further, in some embodiments of the present invention, the first insert height H1 may be measured in the seventh plane P7.

Further, in some embodiments of the present invention, the first insert height H1 may define a minimum insert height between the first pair of opposing side surfaces 66.

Attention is now drawn to FIGS. 9 to 14, showing a cutting tool 74 comprising an insert holder 76 and the cutting insert 20 retained therein.

The insert holder 76 has a holding portion 78 extending along a longitudinal tool axis AL, and the longitudinal tool axis AL defines a forward-to-rearward direction FW, RW.

In some embodiments of the present invention, the holding portion 78 may have a front end surface 80 transverse to the longitudinal tool axis AL facing in the forward direction FW and a seating surface 82 disposed on the front end surface 80.

Also, in some embodiments of the present invention, the insert holder 76 may have a shank portion 84 extending away from the holding portion 78 in the rearward direction RW.

Further, in some embodiments of the present invention, the shank portion 84 may be substantially cylindrical.

As shown in FIGS. 9 to 12, the cutting insert 20 may be removably securable to the holding portion 78, such that in an assembled position of the cutting tool 74, one of the first and second end surfaces 22a, 22b is in abutting contact with the seating surface 82 and exactly one of the at least one cutting portion 26 is operative.

Figure 9:
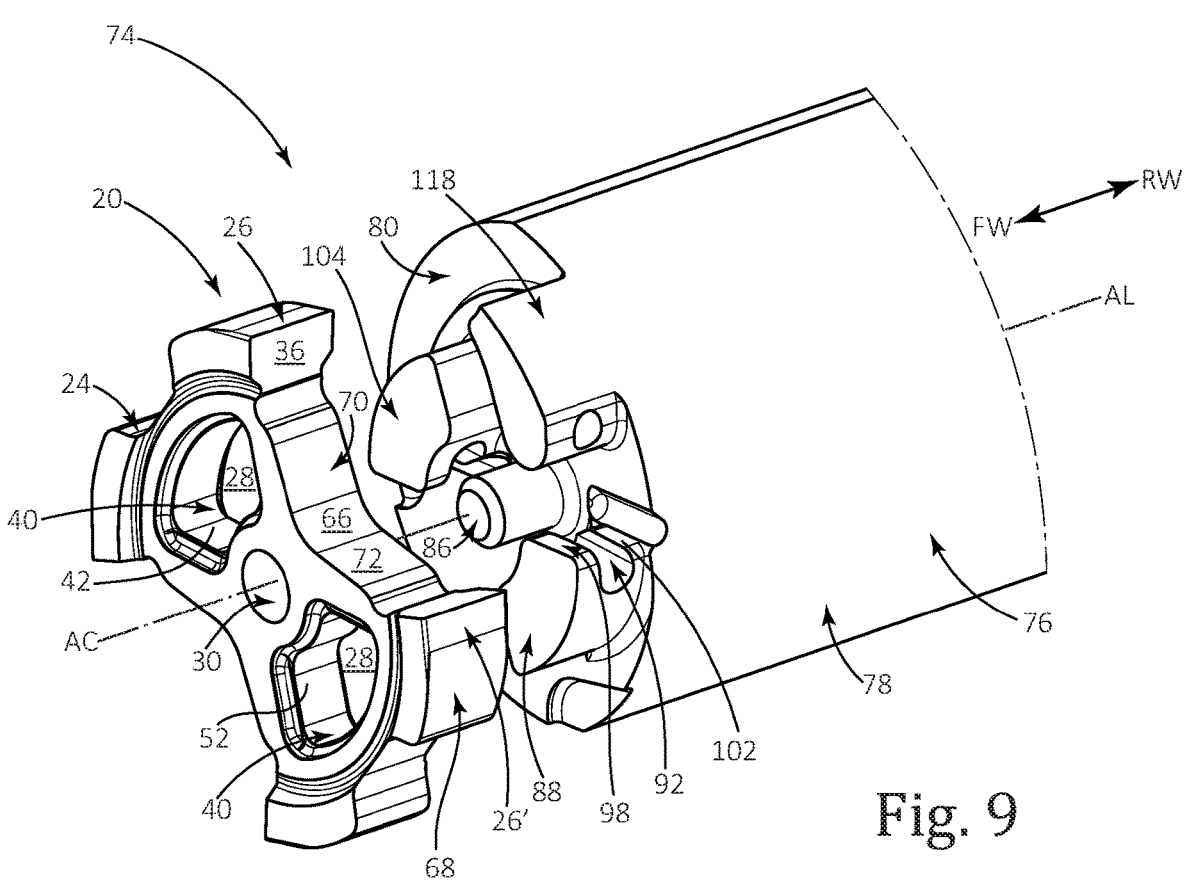
FIG. 9 is an exploded perspective view of a cutting tool in accordance with some embodiments of the present invention.
Figure 10:
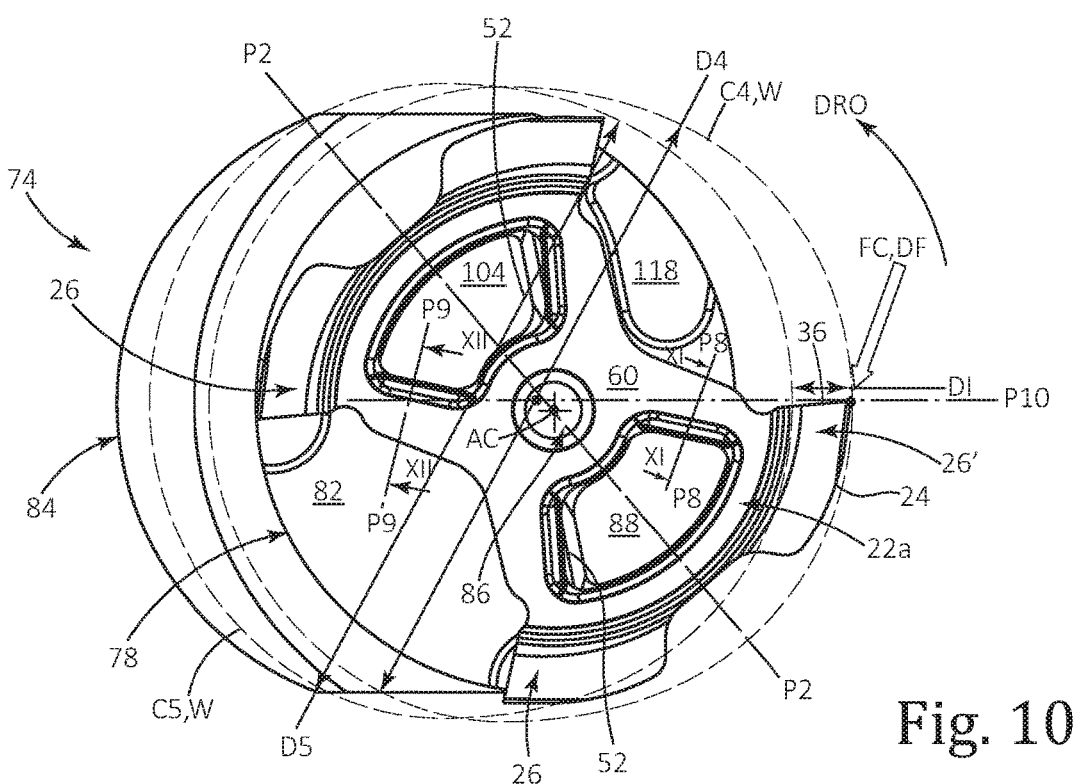
FIG. 10 is an end view of the cutting tool shown in FIG. 9, with a shank portion of an insert holder removed.

It should be appreciated that FIGS. 9 and 10 show the cutting tool 74 configured as a left-handed cutting tool.

In an end view of the cutting tool 74, as shown in FIGS. 10, the rake surface 36 of the operative cutting portion 26' faces in an operative rake direction DRO about the central axis AC.

It should be appreciated that a cutting force FC applied to the operative cutting portion 26' when the cutting insert 20 engages a workpiece W is in a force direction DF about the central axis AC opposite to the operative rake direction DRO.

Figure 13:
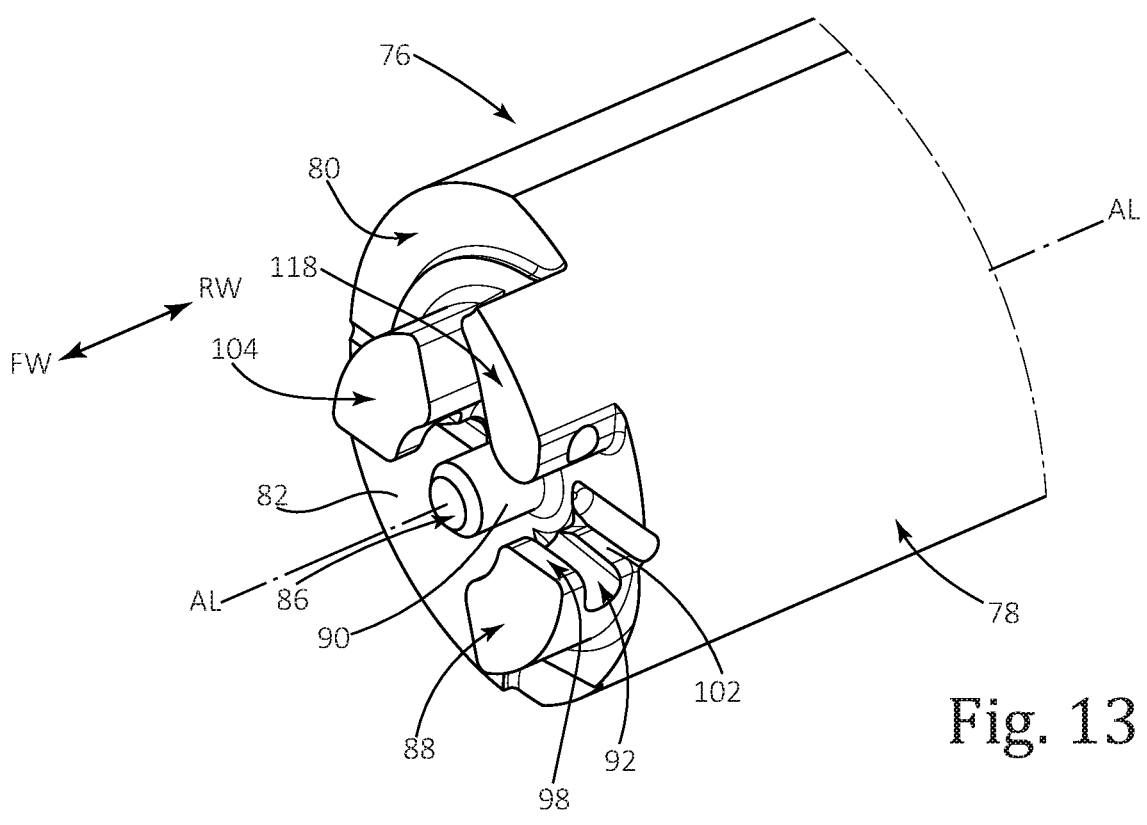
FIG. 13 is a perspective view of the insert holder in accordance with some embodiments of the present invention.
Figure 14:
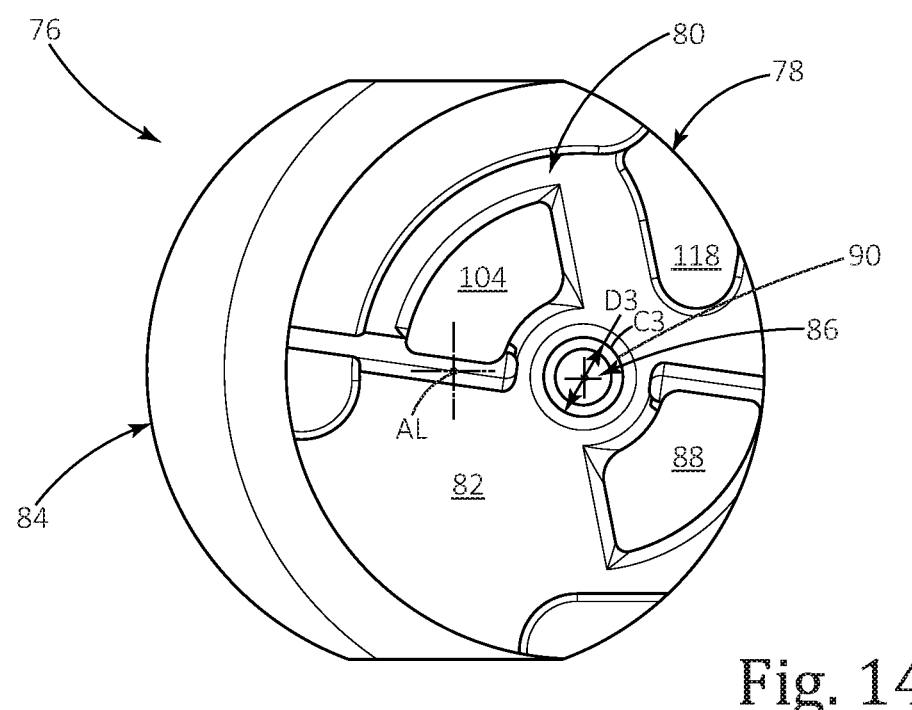
FIG. 14 is an end view of the insert holder shown in FIG. 13.

As shown in FIGS. 13 and 14, the seating surface 82 may have spaced apart first and second mounting protuberances 86, 88 protruding therefrom.

In some embodiments of the present invention, the first mounting protuberance 86 may occupy the central through bore 30, and the second mounting protuberance 88 may occupy one of the at least one mounting cut-out 28.

It should be appreciated that use of the term "occupy" throughout the description and claims refers to the positioning of one element in the space provided by another element and does not require said space to be fully occupied.

Also, in some embodiments of the present invention, the insert holder 76 may be of unitary one-piece construction, and the first and second mounting protuberances 86, 88 may be integrally formed components thereof.

Further, in some embodiments of the present invention, the seating surface 82 may be planar and perpendicular to the longitudinal tool axis AL.

Yet further, in some embodiments of the present invention, the first mounting protuberance 86 may have a cylindrical outer envelope surface 90.

In an end view of the insert holder 76, as shown in FIG. 14, the cylindrical outer envelope surface 90 may define a third imaginary circle C3 having a third diameter D3.

As shown in FIG. 10, the third diameter D3 is less than the second diameter D2, and it should be appreciated that the first mounting protuberance 86 provides a means for locating and centering the cutting insert 20 on the holding portion 78, and allowing rotation of the cutting insert 20 in a direction opposite to the operative rake direction DRO about the central axis AC, from an unassembled position to an assembled position.

Although during assembly the cutting insert 20 may be freely rotated about the first mounting protuberance 86, during a cutting operation in which cutting forces FC act on the cutting insert's operative cutting portion 26', a circumferential portion of the cylindrical inner bore surface 32 may be in contact with a circumferential portion of the cylindrical outer envelope surface 90.

Figure 11:
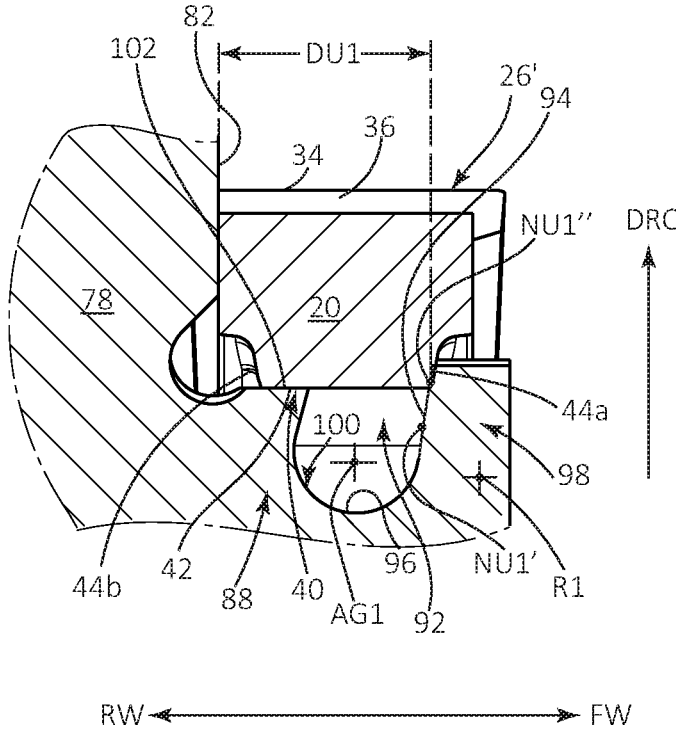
FIG. 11 is a cross-sectional view of the cutting tool shown in FIG. 10, taken along the line XI-XI.

As shown in FIGS. 11 and 13, the second mounting protuberance 88 may have a first mounting undercut 92 with respect to the forward direction FW.

It should be appreciated that use of the term "undercut" throughout the description and claims may refer to a recess or passage of the holding portion 78, where an imaginary straight line extending in a certain direction away from a surface of the holding portion 78 intersects a sub-surface of said recess or passage.

In an assembled position of the cutting tool 74, the cut-out peripheral surface 40 of the mounting cut-out 28 occupied by the second mounting protuberance 88 may engage the first mounting undercut 92.

As shown in FIG. 11, the first mounting undercut 92 may have a first undercut first sub-surface 94 facing in the rearward direction RW and an adjacent first undercut second sub-surface 96 facing in the operative rake direction DRO about the central axis AC.

In some embodiments of the present invention, the first undercut second sub-surface 96 may be located closer to the seating surface 82 than the first undercut first sub-surface 94.

In an assembled position of the cutting tool 74, the cut-out peripheral surface 40 of the mounting cut-out 28 occupied by the second mounting protuberance 88 may be in clamping contact with the first undercut first sub-surface 94.

In some embodiments of the present invention, the first undercut first sub-surface 94 may be located on a resiliently displaceable first clamping finger 98 of the second mounting protuberance 88.

Also, in some embodiments of the present invention, the resiliently displaceable first clamping finger 98 may be located distally from the seating surface 82.

By configuring the cutting tool 74 to have an assembled position in which the cut-out peripheral surface 40 of one of the at least one mounting cut-out 28 is in clamping contact with the first undercut first sub-surface 94, abutting contact is promoted between one of the first and second end surfaces 22a, 22b and the seating surface 82 without the need for an additional clamping component, for example, a clamping screw passing through the central through bore 30 and engaging a threaded bore in the seating surface 82. Benefits of configuring the cutting tool 74 without such an additional clamping component, include: reduced 'down' time associated with indexing and/or replacement of the cutting insert 20, reduced risk of inadvertent falling parts, and reduced material/component costs.

It should be appreciated that rotation of the cutting insert 20 about the central axis AC, from an unassembled position to an assembled position, and from an assembled position to an unassembled position, may be performed manually by an operator using an assembly tool (not shown) which engages the cutting insert's insert peripheral surface 24.

It should also be appreciated that the cutting insert 20 may require less than thirty degrees of rotation about the central axis AC, from an unassembled position to an assembled position, and from an assembled position to an unassembled position.

In some embodiments of the present invention, the first undercut second sub-surface 96 may be located on a first undercut groove 100 extending along a first groove axis AG1 transverse to the longitudinal tool axis AL.

Also, in some embodiments of the present invention, the first groove axis AG1 may be parallel to the seating surface 82.

Further, in some embodiments of the present invention, the resiliently displaceable first clamping finger 98 may have a first resilience axis of rotation R1 parallel to the first groove axis AG1.

As shown in FIG. 11, in a cross-section taken in an eighth plane P8 parallel to the longitudinal tool axis AL and intersecting the first undercut first and second sub-surfaces 94, 96, the first undercut first sub-surface 94 may be inclined in the forward direction FW from a first undercut first point NU1' to a first undercut second point NU1" located rotationally ahead of the first undercut first point NU1' in the operative rake direction DRO about the central axis AC.

Also, as shown in FIG. 11, the first undercut second point NU1" is located a first undercut distance DU1 from the seating surface 82.

In some embodiments of the present invention, the first undercut distance DU1 may increase from an unassembled position to an assembled position of the cutting tool 74, as the first clamping finger 98 undergoes resilient displacement about the first resilience axis of rotation R1.

For embodiments of the present invention in which the cutting insert 20 has at least one mounting cut-out 28 and at least two cutting portions 26, assembly of the cutting tool 74 may be achieved in at least two index positions of the cutting insert 20. In each index position of the cutting insert 20, one of the first and second flank surfaces 42, 52 of one of the at least one mounting cut-out 28 may occupy the first mounting undercut 92 and be located between the first undercut first sub-surface 94 and the seating surface 82.

For embodiments of the present invention in which the cutting insert 20 has exactly four cutting portions 26 and exactly two mounting cut-outs 28, assembly of the cutting tool 74 may be achieved in four index positions of the cutting insert 20. In each index position of the cutting insert 20, one of the first upper slope surface 44a or second lower slope surface 58b of the mounting cut-out 28 occupied by the second mounting protuberance 88 may be in clamping contact with the first undercut first sub-surface 94.

For other embodiments of the present invention (not shown), in which the cutting tool 74 is configured as a right-handed cutting tool, and the operative rake direction DRO about the central axis AC is reversed, it should be appreciated that in each index position of the cutting insert 20, one of the first lower slope surface 44b or second upper slope surface 58b of the mounting cut-out 28 occupied by the second mounting protuberance 88 may be in clamping contact with the first undercut first sub-surface 94.

As shown in FIG. 11, the second mounting protuberance 88 may have a first reaction surface 102 transverse to the seating surface 82, and the first reaction surface 102 may face in the operative rake direction DRO about the central axis AC.

In some embodiments of the present invention, the first reaction surface 102 may be planar.

Also, in some embodiments of the present invention, the first reaction surface 102 may be parallel to the longitudinal tool axis AL.

In an assembled position of the cutting tool 74, the cut-out peripheral surface 40 of the mounting cut-out 28 occupied by the second mounting protuberance 88 may be in abutting contact with the first reaction surface 102.

By configuring the cutting tool 74 to have an assembled position in which the cut-out peripheral surface 40 of the mounting cut-out 28 occupied by the second mounting protuberance 88 abuts against the first reaction surface 102, it should be firstly appreciated that the cutting insert's operative cutting portion 26' may be positioned on the insert holder 76 with a high degree of repeatability following indexing and/or replacement of the cutting insert 20, and secondly appreciated that clamping contact between the second mounting protuberance's first undercut first sub-surface 94 and the cut-out peripheral surface 40 of the mounting cut-out 28 occupied by the second mounting protuberance 88, particularly one of the first upper slope surface 44a or second lower slope surface 58b thereof, may be achieved without the resiliently displaceable first clamping finger 98 undergoing excessive displacement.

Also, by configuring the first reaction surface 102 to face in the operative rake direction DRO about the central axis AC, it should be appreciated that during a cutting operation in which cutting forces FC act on the cutting insert's operative cutting portion 26', the abutting contact between the cut-out peripheral surface 40 of the mounting cut-out 28 occupied by the second mounting protuberance 88 and the first reaction surface 102 is reinforced.

In some embodiments of the present invention, the first reaction surface 102 may be disposed in the first mounting undercut 92.

Also, in some embodiments of the present invention, the first reaction surface 102 may be located closer to the seating surface 82 than the first undercut second sub-surface 96.

As shown in FIG. 11, in the cross-section taken in the eighth plane P8, one of the first and second flank surfaces 42, 52 of the mounting cut-out 28 occupied by the second mounting protuberance 88 may be in abutting contact with the first reaction surface 102.

As shown in FIG. 10, it should also be appreciated that in an assembled position of the cutting tool 74, one of the first and second flank surfaces 42, 52 of the mounting cut-out 28 occupied by the second mounting protuberance 88 may be entirely spaced apart from the second mounting protuberance 88.

As shown in FIGS. 13 and 14, the holding portion's seating surface 82 may have a third mounting protuberance 104 protruding therefrom.

In some embodiments of the present invention, the third mounting protuberance 104 may have a second mounting undercut 106 with respect to the forward direction FW.

Figure 12:
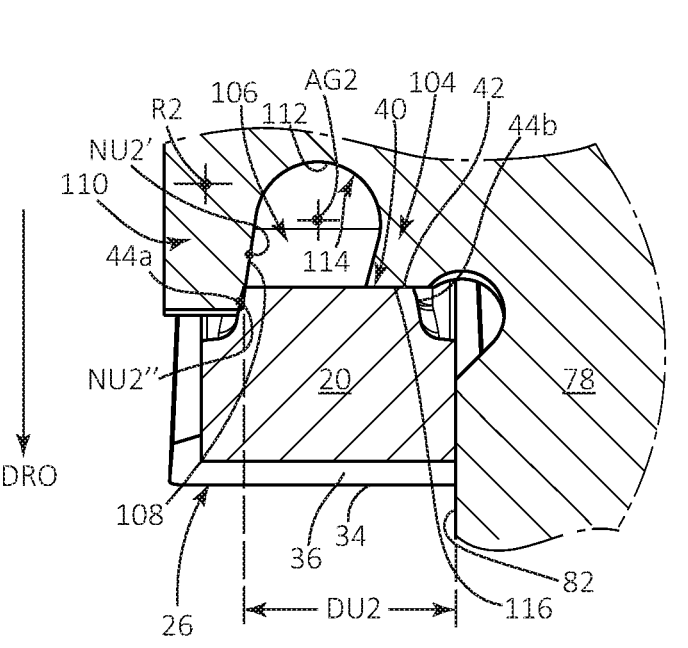
FIG. 12 is a cross-sectional view of the cutting tool shown in FIG. 10, taken along the line XII-XII.

As shown in FIG. 12, the second mounting undercut 106 may have a second undercut first sub-surface 108 facing in the rearward direction RW and an adjacent second undercut second sub-surface 112 facing in the operative rake direction DRO about the central axis AC.

In some embodiments of the present invention, the second undercut second sub-surface 112 may be located closer to the seating surface 82 than the second undercut first sub-surface 108.

For embodiments of the present invention in which the cutting insert 20 has exactly two mounting cut-outs 28, the third mounting protuberance 104 may occupy one of the two mounting cut-outs 28, and in each index position of the cutting insert 20, one of the first upper slope surface 44a or second lower slope surface 58b of the mounting cut-out 28 occupied by the third mounting protuberance 104 may be in clamping contact with the second undercut first sub-surface 108. Also, for such embodiments of the present invention, in each index position of the cutting insert 20, no portion of the entire insert peripheral surface 24 may make abutting contact with the holding portion 78.

For other embodiments of the present invention (not shown), in which the cutting tool 74 is configured as a right-handed cutting tool, and the operative rake direction DRO about the central axis AC is reversed, it should be appreciated that in each index position of the cutting insert 20, one of the first lower slope surfaces 44b or second upper slope surface 58a of the mounting cut-out 28 occupied by the third mounting protuberance 104 may be in clamping contact with the second undercut first sub-surface 108.

In some embodiments of the present invention, the second undercut first sub-surface 108 may be located on a resiliently displaceable second clamping finger 110 of the third mounting protuberance 104.

Also, in some embodiments of the present invention, the resiliently displaceable second clamping finger 110 may be located distally from the seating surface 82.

Further, in some embodiments of the present invention, the second undercut second sub-surface 112 may be located on a second undercut groove 114 extending along a second groove axis AG2 transverse to the longitudinal tool axis AL.

Yet further, in some embodiments of the present invention, the second groove axis AG2 may be parallel to the seating surface 82.

Yet still further, in some embodiments of the present invention, the resiliently displaceable second clamping finger 110 may have a second resilience axis of rotation R2 parallel to the second groove axis AG2.

As shown in FIG. 12, in a cross-section taken in a ninth plane P9 parallel to the longitudinal tool axis AL and intersecting the second undercut first and second sub-surfaces 108, 112, the second undercut first sub-surface 108 may be inclined in the forward direction FW from a second undercut first point NU2' to a second under second point NU2" located rotationally ahead of the second undercut first point NU2' in the operative rake direction DRO about the central axis AC.

Also, as shown in FIG. 12, the second under second point NU2" is located a second undercut distance DU2 from the seating surface 82.

In some embodiments of the present invention, the second undercut distance DU2 may increase from an unassembled position to an assembled position of the cutting tool 74, as the second clamping finger 110 undergoes resilient displacement about the second resilience axis of rotation R2.

As shown in FIG. 12, the third mounting protuberance 104 may have a second reaction surface 116 transverse to the seating surface 82, and the second reaction surface 116 may face in the operative rake direction DRO about the central axis AC.

In some embodiments of the present invention, the second reaction surface 116 may be planar.

Also, in some embodiments of the present invention, the second reaction surface 116 may be parallel to the longitudinal tool axis AL.

In an assembled position of the cutting tool 74, the cut-out peripheral surface 40 of the mounting cut-out 28 occupied by the third mounting protuberance 104 may be in abutting contact with the second reaction surface 116. For such embodiments of the present invention, it should be appreciated that the abutting contact between the cut-out peripheral surface 40 of the mounting cut-out 28 occupied by the third mounting protuberance 104 and the second reaction surface 116 may occur simultaneously with the abutting contact between the cut-out peripheral surface 40 of the mounting cut-out 28 occupied by the second mounting protuberance 88 and the first reaction surface 102.

For other embodiments of the present invention (not shown), in which the cutting insert 20 has exactly two cutting portions 26 and a single mounting cut-out 28, in each index position of the cutting insert 20, the third mounting protuberance 104 may be located adjacent the insert peripheral surface 24, and a portion of the insert peripheral surface 24 may make abutting contact with the third mounting protuberance's second reaction surface 116.

In some embodiments of the present invention, the second reaction surface 116 may be disposed in the second mounting undercut 106.

Also, in some embodiments of the present invention, the second reaction surface 116 may be located closer to the seating surface 82 than the second undercut second sub-surface 108.

As shown in FIG. 12, in the cross-section taken in the ninth plane P9, one of the first and second flank surfaces 42, 52 of the mounting cut-out 28 occupied by the third mounting protuberance 104 may be in abutting contact with the second reaction surface 116.

As shown in FIG. 10, it should also be appreciated that in an assembled position of the cutting tool 74, one of the first and second flank surfaces 42, 52 of the mounting cut-out 28 occupied by the third mounting protuberance 104 may be entirely spaced apart from the third mounting protuberance 104.

As shown in FIG. 10, in an end view of the cutting tool 74, a fourth imaginary circle C4 having a fourth diameter D4 contains the entire cutting insert 20 and the entire holding portion 78, and a fifth imaginary circle C5 having a fifth diameter D5 contains exactly three of the four cutting edges 34 and the entire holding portion 78.

In some embodiments of the present invention, the first diameter D1 may be greater than seventy-five percent of the fourth diameter D4, i.e., D1>0.75*D4.

Also, in some embodiments of the present invention, the first diameter D1 may preferably be greater than eighty-five percent of the fourth diameter D4, i.e., D1>0.85*D4.

Further, in some embodiments of the present invention, in an end view of the cutting tool 74, the fourth imaginary circle C4 may not contain the shank portion 84.

As shown in FIG. 10, the fourth diameter D4 is equal to the fifth diameter D5, and the centers of the fourth and fifth imaginary circles C4, C5 are contained in a tenth plane P10.

In some embodiments of the present invention, the radially outermost cutting point NC of the operative cutting portion's cutting edge 34 may be coincident with the tenth plane P10.

It should be appreciated that the fourth imaginary circle C4 represents a bore in the workpiece W prior to engagement of the operative cutting portion 26' therewith, and the fifth imaginary circle C5 represents the bore in the workpiece W during an internal grooving operation, whereby the offset between the centers of the fourth and fifth imaginary circles C4, C5 along the tenth plane P10 represents a depth of insertion DI of the operative cutting portion 26' in the workpiece W.

As shown in FIGS. 13 and 14, the holding portion's front end surface 80 may have an auxiliary protuberance 118 protruding therefrom.

For embodiments of the present invention in which the cutting insert 20 has exactly four cutting portions 26, in each of the four index positions of the cutting insert 20 in an assembled position of the cutting tool 74, as shown in FIG. 10, the auxiliary protuberance 118 may be located adjacent the insert peripheral surface 24, between the rake surface 36 of the insert's operative cutting portion 26' and the rake surface 36 of the insert's non-operative cutting portion 26 located on the same side of the second plane P2.

For such embodiments of the present invention, it should be appreciated that during a groove turning operation in which a single cutting portion 26 is operative, cutting chips flowing away from the operative cutting portion 26' along the adjacent chip evacuation surface 70 will be deflected by the auxiliary protuberance 118, thus reducing the risk of the cutting chips inadvertently colliding with and damaging the non-operative cutting portion 26 located on the same side of the second plane P2.

Although the present invention has been described to a certain degree of particularity, it should be understood that various alterations and modifications could be made without departing from the spirit or scope of the invention as hereinafter claimed.

What is claimed is:

1. A cutting insert (20) comprising opposing first and second end surfaces (22a, 22b) with an insert peripheral surface (24) and a central axis (AC) extending therebetween, the cutting insert (20) having at least one cutting portion (26), at least one mounting cut-out (28), and a central through bore (30) extending between and intersecting the first and second end surfaces (22*a*, 22*b*), a median plane (M) perpendicular to the central axis (AC) is located midway between the first and second end surfaces (22*a*, 22*b*), and the first and second end surfaces (22*a*, 22*b*) are located on first and second sides (S1, S2) of the median plane (M), respectively, each of the at least one cutting portion (26) having a cutting edge (34) formed at the intersection of a rake surface (36) and a relief surface (38), the at least one rake surface (36) and the at least one relief surface (38) formed on the insert peripheral surface (24), at least one of the at least one rake surface (36) facing in a first rotary direction (DR1) about the central axis (AC), each of the at least one mounting cut-out (28) extending between and intersecting the first and second end surfaces (22*a*, 22*b*) and having a cut-out peripheral surface (40), the cut-out peripheral surface (40) including a first flank surface (42) and at least one adjacent first slope surface (44*a*, 44*b*), the at least one first flank surface (42) facing in a second rotary direction (DR2) about the central axis (AC) opposite to the first rotary direction (DR1), and one of the at least one first slope surface (44*a*, 44*b*) being a first upper slope surface (44*a*) located on the first side (S1) of the median plane (M), facing away from the median plane (M), wherein, in a cross-section taken in a first plane (P1) parallel to the central axis (AC) and transversely intersecting one of the at least one first flank surface (42) and the adjacent first upper slope surface (44*a*):

the first upper slope surface (44*a*) extends away from the median plane (M) with increasing distance from the first flank surface (42);

a first imaginary straight line (L1) tangential to the first upper slope surface (44*a*) forms an acute first slope angle ($\alpha1$) with the median plane (M); and the first slope angle ($\alpha1$) is greater than five degrees and less than twenty-five degrees.

2. The cutting insert (20) according to claim 1, wherein:

the cutting insert (20) is indexable and has at least two cutting portions (26), and each of the at least one mounting cut-out (28) has a second flank surface (52) and at least one adjacent second slope surface (58*a*, 58*b*) disposed on its cut-out peripheral surface (40), and wherein:

at least one of the at least two rake surfaces (36) faces in the second rotary direction (DR2) about the central axis (AC), and the at least one second flank surface (52) faces in the first rotary direction (DR1) about the central axis (AC).

3. The indexable cutting insert (20) according to claim 2, wherein:

the first and second flank surfaces (42, 52) of each of the at least one mounting cut-out (28) diverge away from each other with increased distance from the central axis (AC).

4. The indexable cutting insert (20) according to claim 2, wherein:

the median plane (M) intersects each of the at least two cutting edges (34), and the median plane (M) intersects the first and second flank surfaces (42, 52) of each of the at least one mounting cut-out (28).

5. The cutting insert (20) according to claim 2, wherein:

the at least one second slope surface (58*a*, 58*b*) faces away from the median plane (M), and wherein, in a cross-section taken in a third plane (P3) parallel to the central axis (AC) and transversely intersecting one of the at least one second flank surface (52) and the adjacent second slope surface (58*a*, 58*b*):

the second slope surface (58*a*, 58*b*) extends away from the median plane (M) with increasing distance from the second flank surface (52);

a second imaginary straight line (L2) tangential to the second slope surface (58*a*, 58*b*) forms an acute second slope angle ($\alpha2$) with the median plane (M); and the second slope angle ($\alpha2$) is equal to the first slope angle ($\alpha1$).

6. The indexable cutting insert (20) according to claim 2, wherein:

the central through bore (30) extends through a central body portion (60) of the cutting insert (20) and intersects first and second central sub-surfaces (62*a*, 62*b*) of the first and second end surfaces (22*a*, 22*b*), respectively.

7. The indexable cutting insert (20) according to claim 6, wherein in a direction parallel to the central axis (AC):

each cutting portion (26) has a cutting width (WC) defined by its cutting edge (34), the central body portion (60) has a body width (WB) defined by the first and second central sub-surfaces (62*a*, 62*b*), and the body width (WB) is less than the cutting width (WC) of each cutting portion (26).

8. The indexable cutting insert (20) according to claim 6, wherein:

the first and second central sub-surfaces (62*a*, 62*b*) define fourth and fifth planes (P4, P5) perpendicular to the central axis (AC), and the first upper slope surface (44*a*) and the second slope surface (58*a*, 58*b*) of each of the at least one mounting cut-out (28) are entirely located between the fourth and fifth planes (P4, P5).

9. The cutting insert (20) according to claim 2, wherein:

the at least one second slope surface (58*a*, 58*b*) is a second lower slope surface (58*b*) located on the second side (S2) of the median plane (M).

10. The indexable cutting insert (20) according to claim 2, wherein:

each cutting edge (34) has a radially outermost cutting point (NC), and in an end view of the cutting insert (20), the at least two radially outermost cutting points (NC) define a first imaginary circle (C1) having a first diameter (D1) and a center coincident with the central axis (AC), the central through bore (30) has a cylindrical inner bore surface (32), in an end view of the cutting insert (20), the cylindrical inner bore surface (32) defines a second imaginary circle (C2) having a second diameter (D2), and the second diameter (D2) is less than twenty percent of the first diameter (D1).

11. The indexable cutting insert (20) according to claim 10, wherein:

a sixth plane (P6) perpendicular to the central axis (AC) intersects the cylindrical inner bore surface (32), and the sixth plane (P6) is located further from the median plane (M) than at least a portion of the first upper slope surface (44a) and at least a portion of the second slope surface (58a, 58b).

12. The indexable cutting insert (20) according to claim 10, wherein:
the central through bore (30) has a first axial extent (EA1) along the central axis (AC),
the cylindrical inner bore surface (32) has a second axial extent (EA2) along the central axis (AC), and
the second axial extent (EA2) is greater than sixty percent of the first axial extent (EA1).

13. The indexable cutting insert (20) according to claim 2, wherein:
the cutting insert (20) has exactly two mounting cut-outs (28) and exactly four cutting portions (26).

14. The indexable cutting insert (20) according to claim 13, wherein:
the cutting insert (20) exhibits 2-fold rotational symmetry about the central axis AC.

15. A cutting tool comprising an insert holder and the cutting insert in accordance with claim 1 retained therein,
the insert holder (76) having a holding portion (78) extending along a longitudinal tool axis (AL),
the longitudinal tool axis (AL) defining a forward-to-rearward direction (FW, RW), and
the holding portion (78) having a front end surface (80) transverse to the longitudinal tool axis (AL) facing in the forward direction (FW) and a seating surface (82) disposed on the front end surface (80),
the seating surface (82) having spaced apart first and second mounting protuberances (86, 88) protruding therefrom,
the cutting insert (20) is removably securable to the holding portion (78),
wherein, in an assembled position of the cutting tool (74):
one of the first and second end surfaces (22a, 22b) is in abutting contact with the seating surface (82),
the first mounting protuberance (86) occupies the central through bore (30),
the second mounting protuberance (88) occupies one of the at least one mounting cut-out (28),
exactly one of the at least one cutting portion (26) is operative, and
in an end view of the cutting tool (74), the rake surface (36) of the operative cutting portion (26') faces in an operative rake direction (DRO) about the central axis (AC).

16. The cutting tool (74) according to claim 15, wherein:
the second mounting protuberance (88) has a first reaction surface (102) transverse to the seating surface (82),
the first reaction surface (102) faces in the operative rake direction (DRO) about the central axis (AC), and
the cut-out peripheral surface (40) of the mounting cut-out (28) occupied by the second mounting protuberance (88) is in abutting contact with the first reaction surface (102).

17. The cutting tool (74) according to claim 15, wherein:
the second mounting protuberance (88) has a first mounting undercut (92) with respect to the forward direction (FW), and
the cut-out peripheral surface (40) of the mounting cut-out (28) occupied by the second mounting protuberance (88) engages the first mounting undercut (92).

18. The cutting tool (74) according to claim 17, wherein:
the first mounting undercut (92) has a first undercut first sub-surface (94) facing in the rearward direction (RW)

and an adjacent first undercut second sub-surface (96) facing in the operative rake direction (DRO) about the central axis (AC).

19. The cutting tool (74) according to claim 18, wherein:
the cut-out peripheral surface (40) of the mounting cut-out (28) occupied by the second mounting protuberance (88) is in clamping contact with the first undercut first sub-surface (94).

20. The cutting tool (74) according to claim 18, wherein:
the cutting insert (20) is indexable and has at least two cutting portions (26),
at least one of the at least two rake surfaces (36) faces in the second rotary direction (DR2) about the central axis (AC),
each of the at least one mounting cut-out (28) has a second flank surface (52 disposed on its cut-out peripheral surface (40), and
the at least one second flank surface (52) faces in the first rotary direction (DR1) about the central axis (AC),
and wherein, in each index position of the cutting insert (20):
one of the first and second flank surfaces (42, 52) of one of the at least one mounting cut-out (28) occupies the first mounting undercut (92) and is located between the first undercut first sub-surface (94) and the seating surface (82).

21. The cutting tool (74) according to claim 20, wherein:
each of the at least one mounting cut-out (28) has a second slope surface (58a, 58b) disposed on its cut-out peripheral surface (40) adjacent the second flank surface (52), and
the at least one second slope surface (58a, 58b) is a second lower slop surface (58b) located on the second side (S2) of the median plane (M).

22. The cutting tool (74) according to claim 21, wherein:
the cutting insert (20) has exactly four cutting portions (26) and exactly two mounting cut-outs (28),
the two mounting cut-outs (28) are identical to each other,
and wherein, in each index position of the cutting insert (20):
one of the first upper slope surface (44a) or second lower slope surface (58b) of the mounting cut-out (28) occupied by the second mounting protuberance (88) is in clamping contact with the first undercut first subsurface (94).

23. The cutting tool (74) according to claim 22, wherein:
the holding portion's seating surface (82) has a third mounting protuberance (104) protruding therefrom, and
the third mounting protuberance (104) occupies one of the two mounting cut-outs (28).

24. The cutting tool (74) according to claim 23, wherein:
the third mounting protuberance (104) has a second mounting undercut (106) with respect to the forward direction (FW), and
the second mounting undercut (106) has a second undercut first sub-surface (108) facing in the rearward direction (RW) and an adjacent second undercut second sub-surface (112) facing in the operative rake direction (DRO) about the central axis (AC),
and wherein, in each index position of the cutting insert (20):
one of the first upper slope surfaces (44a) or second lower slope surface (58b) of the mounting cut-out (28) occupied by the third mounting protuberance (104) is in clamping contact with the second undercut first sub-surface (108).

\* \* \* \* \*